May 1, 1934.  C. J. HANSEN  1,957,266
PROCESS FOR THE PRODUCTION OF AMMONIUM SULPHATE
Filed July 17, 1931
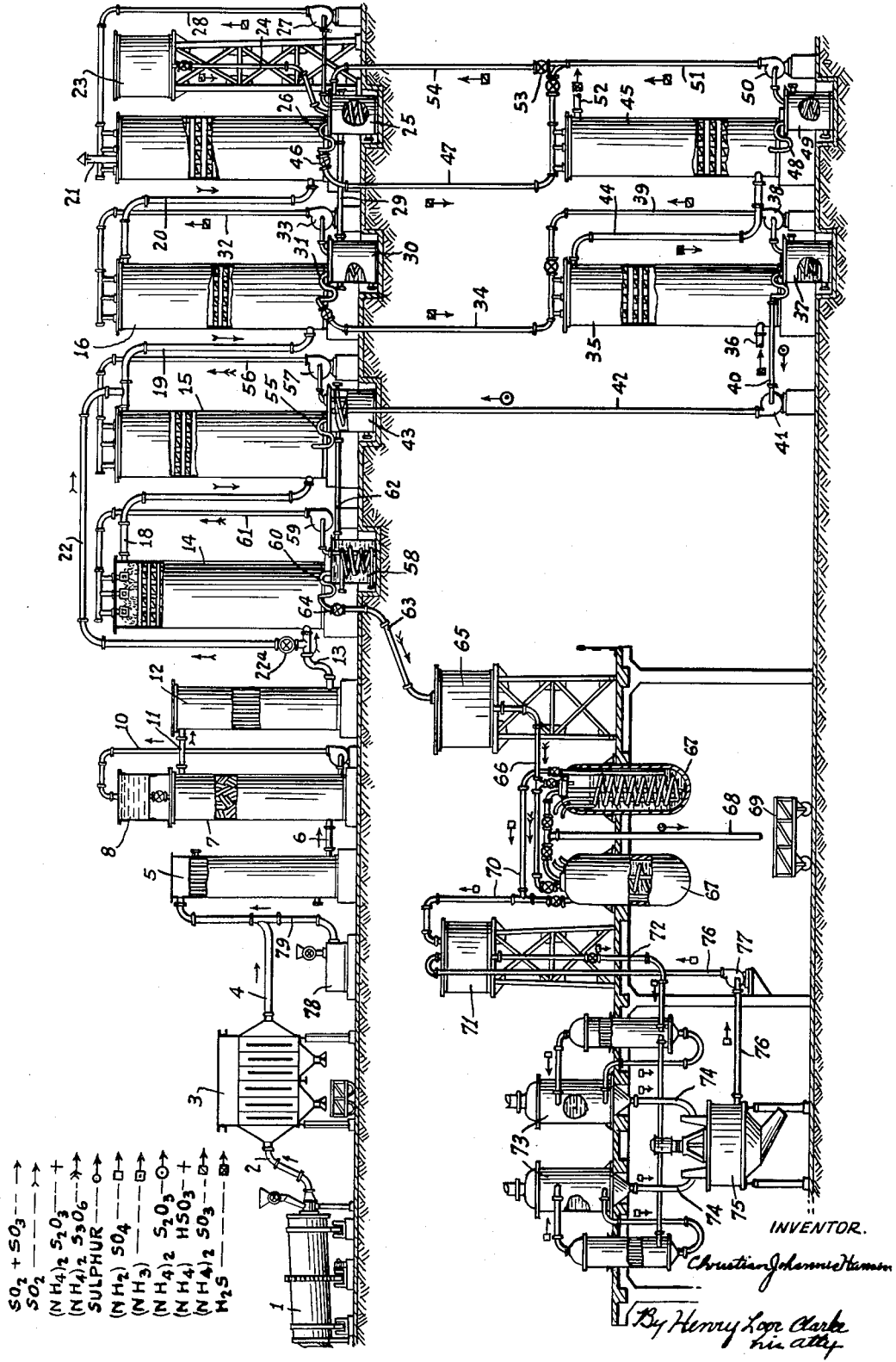
INVENTOR.
Christian Johannes Hansen
By Henry Loop Clarke
his atty Patented May 1, 1934

UNITED STATES PATENT OFFICE 1,957,266

PROCESS FOR THE PRODUCTION OF AMMONIUM SULPHATE

Christian Johannes Hansen, Essen-Ruhr, Germany, assignor, by mesne assignments, to The Koppers Company of Delaware, Pittsburgh, Pa., a corporation of Delaware Application July 17, 1931, Serial No. 551,531
In Germany July 18, 1930

7 Claims. (Cl. 23—119)

The invention relates to the production of ammonium sulphate from gaseous sulphur dioxide or gases containing same and aqueous ammonia solution, and more especially to the production of ammonium sulphate from the primary substances named by which from the ammonia and the sulphurous acid, first of all a solution containing ammonium sulphite and possibly ammonium bisulphite is produced which is converted, after complete or partial conversion of the sulphite-bisulphite into ammonium thiosulphate and ammonium polythionate, by heating, preferably under pressure, into ammonium sulphate and sulphur.

For the conversion of the ammonium sulphites into ammonium thiosulphate in the above mentioned process the ammonium sulphite was treated with sulphur whereby the reaction according to the following equation takes place:

$$(NH_4)_2SO_3 + S = (NH_4)_2S_2O_3.$$

The object of the present invention is improvements on the above mentioned process by which same is simplified and the conversion of the ammonium sulphite into ammonium thiosulphate is simultaneously facilitated.

The process, according to this invention, consists in producing from the gaseous sulphurous acid or gases containing same and aqueous ammonia solutions firstly a solution of ammonium bisulphite, which entirely or partly is treated with hydrogen sulphide or with gases containing same, whereby, according to the quantity of the hydrogen sulphide, the bisulphite is converted entirely or partly into ammonium thiosulphate, which is converted then by means of sulphurous acid entirely or partly into ammonium polythionate whereupon the latter is converted finally by heating into ammonium sulphate, sulphur and possibly sulphuric acid.

Further, according to the invention, such a quantity of hydrogen sulphide is brought into contact with the ammonium bisulphite that the entire bisulphite is not converted into ammonium thiosulphate but in addition, there is formed a certain quantity of ammonium polythionate so that the solution resulting after the treatment with hydrogen sulphide can be converted directly by heating, possibly under pressure, into ammonium sulphate and sulphur.

The reaction follows the equations given below:

$$(NH_4)_2S_3O_6 + 3H_2S = (NH_4)_2S_2O_3 + 4S + 3H_2O$$
$$4NH_4HSO_3 + H_2S = (NH_4)_2S_2O_3 +$$
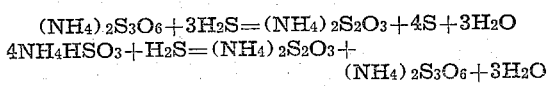
$$(NH_4)_2S_3O_6 + 3H_2O$$

The hydrogen sulphide required for the conversion of the ammonium bisulphite into ammonium thiosulphate can be taken from any desired sources. It is also possible to utilize for the conversion of the bisulphite, containing hydrogen sulphide, for instance coal distillation gases. This is especially of advantage, as the ammonium bisulphite solution absorbs quantitatively by a quick reaction hydrogen sulphide and thereby a very good and inexpensive freeing of the coal distillation gases from hydrogen sulphide, is attained.

Furthermore, the object of the invention is various improvements and novelties, in connection with the process described, according to this invention which are intended to render the process according to the invention technically more effective and more economical, as is made clear in the following description and in the claims.

On the drawing, there is shown apparatus serving for the carrying out of the process according to the invention.

In the apparatus shown on the drawing, the sulphur dioxide required for this process is produced by the roasting of pyrites or the like in a burner 1 which is connected up by means of the pipe line 2 with a dust separator apparatus 3, in such a manner, that the gases resulting from the roasting of the pyrites are led forward to the apparatus 3. In the apparatus 3, the dust is separated out of the gas. Then the gases go forward by the pipe line 4 to a tubular cooler 5 in which they are cooled down to about 40°. The gases, cooled down and freed from dust, leave the cooler 5 by the pipe line 6 and are carried forward to the washing tower 7, in which they are brought into contact with sulphuric acid, which is supplied from a storage tank 8 at the top of the tower 7, whereby the sulphur trioxide is washed out from the gases. The sulphuric acid reaching the bottom of the washer 7, is carried back by the pump 9 and the pipe line 10 to the storage tank 8.

The gases which now, apart from sulphur dioxide, contain practically no other sulphur compounds, go forward from the washer 7 through the pipe line 11 into a second tubular cooler 12 in which they are reduced down to about 30–40° C. The gases are then led forward by the pipe line 13 to a group of washers, consisting of the four washers 14, 15, 16, 17, which are connected up with one another by the pipe line 18, 19 and 20. The gases pass through the washers 14, 15, 16 and 17, whereby the entire sulphur dioxide is removed from same, and they leave then the washer 17 by the run-off pipe line 21.

As regards the function of the washers 14 and 17, this point will be touched upon later. It may, however, now be remarked that the gas pipe line 13 is connected up directly with a pipe line 19 leading to the washer 16 by means of a by-pass pipe line 22, in which there is fitted a valve 22a for the control of the gas current.

In the washer 17 the gas is brought into contact with an aqueous solution of ammonium sulphite and ammonium bisulphite, which contains those two substances in such a proportion that the solution shows neither an ammonia tension nor sulphur dioxide vapour tension. In the washer 17 the last traces of sulphur dioxide are therefore removed from the gas. To the same extent, in which the solution takes up sulphur dioxide, there is led forward from the storage tank 23 ammoniacal liquor by the pipe line 24. The pipe line 24 is connected up with a vessel 25, serving also as a cooler, to which the washing solution coming forward to the bottom of the washer 17, flows by means of the pipe line 26. From the cooling washer 25, the solution is carried forward by means of the pump 27 through the pipe line 28 to the top of the washing tower 17. The washing liquid is kept circulating through the washer 17 and the cooler 25.

To compensate for the increase in the liquid circulating during the process in the washer 17 and the cooler 25, a portion of the solution in circulation is carried off continuously or intermitently through the pipe line 29 to a cooling and storage vessel 30, which is connected up by means of the pipe lines 31 and 32 with the lower and upper end of the washer 16, where a pump 33 is fitted in the pipe line 32. The elements are, therefore, so arranged that the liquid supplied to the washer 16 is circulated through the washer and cooling vessel 30.

In the tower 16 the tension free ammonium sulphite-ammonium bisulphite solution coming from the tower 17 is brought into contact with the sulphur dioxide in such quantities that the liquid reaching the foot of the washer consists entirely or in greater part of ammonium bisulphite. In any case, the solution in the washing tower 16 must show a distinct sulphurous acid tension.

The volume which is kept circulated through the washer 16 and the cooler 30 increases as the process is continued. For the purpose of keeping constant the volume of the liquid, a portion of the solution reaching the bottom of the washer 16 is continuously or intermittently led off through the pipe line 34 to the top of the washing tower 35. Into this washing tower gaseous hydrogen sulphide or gases containing hydrogen sulphide for instance, non-purified coal distillation gas, is introduced at the bottom through the pipe line 36. In consequence of the contact with the hydrogen sulphide, the ammonium bisulphite solution is converted entirely or partly into ammonium thio- or ammonium polythionate, whereby the hydrogen sulphide is practically completely removed from the gas. The washing fluid reaching the foot of the washer 35 flows partly into the cooling and storage vessel 37 and is carried back by the pump 38 and the pipe line 39 to the top of the washer 35. Another part of the liquid running off from the foot of the washer and consisting namely of ammonium thiosulphate and possibly ammonium polythionate is led forward by the pipe line 40 to a pump 41 by means of which it is impelled forward through the pipe line 42 to a storage tank 43 serving as a cooling vessel.

As ammonium bisulphite solution in the washing tower 35 gives off sulphurous acid to the gas introduced through the pipe line 36 into the tower and leaving the tower by the pipe line 44, it is necessary to again remove from the gas the sulphurous acid. For this purpose, the pipe line 44 is connected up to the lower end of the washer 45 to the top of which through a pipe line 47 controlled by a valve 46, a solution of ammonium sulphite-bisulphite is supplied, which contains these two bodies in such a proportion that the solution shows neither an ammonia nor a sulphur dioxide tension. Practically, therefore, the same fluid circulates in the tower 45 as in the washing tower 17. The fluid flows from the tower 45 through the pipe line 48 into a cooling tank 49, from which it is by means of a pump 50 delivered by the pipe line 51 again to the top of the washer 45.

From the tower 45 the gases escape, which have been completely freed from sulphur dioxide as well as of hydrogen sulphide through the pipe line 52.

The excess amount of fluid, which is used in the tower 45 during the running of the process, is led forward continuously or intermittently through the pipe line 54 (controlled by the valve 53) again to the washing fluid in the tower 17 and treated again with same.

The fluid coming from the treatment of the hydrogen sulphide is led, as already mentioned, first of all to the storage and cooling tank 43 which is connected up by means of a pipe line 55 or 56 with the bottom or upper end respectively of the washing tower 15 so that by means of a pump 57 the washing fluid from the storage tank 43 is raised to the top of the tower 15 and is allowed again to flow off at the foot of same again into the storage tank.

In the tower 15 the liquid is treated with sulphur dioxide and this in such a way that the ammonium thiosulphate entirely or partly is converted into ammonium polythionate, according to the equation:

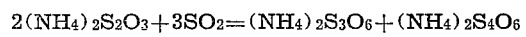

$$2(NH_4)_2S_2O_3 + 3SO_2 = (NH_4)_2S_3O_6 + (NH_4)_2S_4O_6$$

This reaction takes place comparatively slowly and it is therefore advisable to divide it off for several towers, for instance as shown in the drawing to the washing tower 14 and the washing tower 15. For this purpose the cooling and storage vessel 58 of the washing tower 14 which, by making use of the pump 59, in a similar manner as the cooling vessel 43, is connected up by the pipe lines 60 and 61 with the tower 14, connected up with the storage tank 43 by the pipe line 62 so that the solution containing ammonium thiosulphate goes forward from the tower 15 to the tower 14 and can here be kept in circulation. The circulation of the fluid is so regulated that the fluid reaching the foot of the washer 14 has the desired composition. A portion of the fluid is drawn off either continuously or intermittently, through the pipe line 63 controlled by valve 64 into a storage tank 65 from which it is led on to the pipe line 66 to the heatable pressure vessels 67. In these pressure vessels, the solution is heated preferably above the temperatures of the sulphur melting point, which results in a solution of bi- and possibly mono-ammonium sulphate and elementary molten sulphur. The molten sulphur collects in the bottom part of the pressure vessel and is drawn off through the pipe line 68 into the sulphur solidifying boxes 69.

The clear ammonium sulphate solution goes forward to the pipe line 70 into a storage container 71 from which it flows through the pipe line 72 to the evaporators 73 where it is evaporated to the point of crystallization. The crystal solution passes on from the evaporator through the pipe line 74 to a centrifugal 75 where the crystals are separated off from the mother liquor, which latter are led back through the pipe line 76 by means of the pump 77 again to the storage tank 71.

The sulphur produced during the process in the sulphur solidifying boxes 69 in the form of block sulphur is put back again into the process. For this purpose a sulphur burner 78 is provided for, which by means of the pipe line 79, is connected up with the main gas pipe line 4.

Instead of converting the ammonium sulphite and ammonium bisulphite first prepared from the ammonia and sulphur dioxide completely by means of the hydrogen sulphide into ammonium thionate and ammonium polythionate it is naturally possible to complete only a part of the bisulphite with hydrogen sulphide and then to convert the remaining parts by the sulphur into ammonium thiosulphate. In this case, the two separately treated portions of the liquid are brought afterwards together again for the purpose of being further treated. This mode of working is especially to be recommended in cases, where there is not sufficient hydrogen sulphide for the complete conversion of the ammonium bisulphite into ammonium thiosulphate.

The process according to the invention offers very important advantages especially in cases, where hydrogen is recovered from coke oven gas for the purpose of the manufacture of ammonia from the elements, by means of catalysator. In these instances, the coal distillation gas is to be freed from hydrogen sulphide before the hydrogen is separated out.

The carrying out of the process according to the invention utilizing the apparatus shown in the drawing on the assumption that 10 tons of ammonium sulphate are produced in 24 hours, will be as follows:

In the burner 1 12.15 tons pyrites are burned in 24 hours whereby 9.70 tons of sulphur dioxide are produced. Accordingly with the ammonia in the towers 16 and 17 25.1 tons solution are produced in 24 hours which contain 15.4 tons of ammonium bisulphite. This solution is led forward to the washing tower 35 where it is treated with 5.42 tons of gaseous hydrogen sulphide. There results 11.4 tons of ammonium thiosulphate, 4.91 tons of elementary sulphur and 4.13 tons reaction water. From the thiosulphate there is produced by treatment with 2.4 tons sulphur dioxide by the burning of 1.2 tons of elementary sulphur in the sulphur furnace 78 a mixture of ammonium thiosulphate, ammonium trithionate and ammonium tetrathionate. The reaction fluid is heated up in the autoclave 67 under pressure to 150° so that a solution results which contains 10 tons of ammonium sulphate and 8.5 tons of elementary sulphur. After the evaporation of 14 tons of water in the evaporator 73 one gets 10 tons of solid salt.

The invention as hereinabove set forth is embodied in a particular form of construction, but may be variously embodied within the scope of the claims hereinafter made.

I claim:

1. A process for the production of ammonium sulphate and sulphur consisting in bringing into contact gaseous sulphur dioxide and ammonia in the presence of water, producing thereby a solution containing ammonium bisulphite, acting on said bisulphite solution with hydrogen sulphide in such quantities and manner as to convert the bisulphite into both thiosulphate and polythionate by means of the $H_2S$ and finally treating the reaction liquor until ammonium sulphate and sulphur are formed.

2. A process for the production of ammonium sulphate and sulphur consisting in bringing into contact gases containing sulphur dioxide and ammonia in the presence of water, producing thereby a solution containing ammonium bisulphite, acting on said bisulphite solution with hydrogen sulphide in such quantities and manner as to convert the bisulphite into both thiosulphate and polythionate by means of the $H_2S$ and finally treating the reaction liquor until ammonium sulphate and sulphur are formed.

3. A process for the production of ammonium sulphate and sulphur consisting in bringing into contact gaseous sulphur dioxide and ammonia in the presence of water, producing thereby a solution containing ammonium bisulphite, acting on said bisulphite with gases containing hydrogen sulphide in such quantities and manner as to convert the bisulphite into both thiosulphate and polythionate by means of the $H_2S$ and finally treating the reaction liquor until ammonium sulphate and sulphur are formed.

4. A process for the production of ammonium sulphate and sulphur consisting in bringing into contact gaseous sulphur dioxide and ammonia in the presence of water, producing thereby a solution containing ammonium bisulphite acting on said bisulphite solution with hydrogen sulphide in such quantities that the bisulphite is converted into a mixture of both polythionate and thiosulphate and finally treating the reaction liquor until ammonium sulphate and sulphur are formed.

5. A process for the production of ammonium sulphate and sulphur consisting in bringing into contact gaseous sulphur dioxide and ammonia in the presence of water, producing thereby a solution containing ammonium bisulphite, acting on said bisulphite with hydrogen sulphide in such quantities that each four molecules bisulphite are brought into contact with one molecule hydrogen sulphide in such quantities and manner as to convert the bisulphite into both thiosulphate and polythionate by means of the $H_2S$ and finally treating the reaction liquor until ammonium sulphate and sulphur are formed.

6. A process for the production of ammonium sulphate and sulphur consisting in bringing into contact gaseous sulphur dioxide and ammonia in the presence of water, producing thereby a solution containing ammonium bisulphite, acting on said bisulphite solution with hydrogen sulphide in such quantities that the bisulphite is converted into both thiosulphate and part polythionate, acting on the reaction liquor with sulphur dioxide to convert a further quantity of the thiosulphate to polythionate, and finally treating the reaction liquor until ammonium sulphate and sulphur are formed.

7. A process for the production of ammonium sulphate and sulphur consisting in bringing into contact gaseous sulphur dioxide and ammonia in the presence of water, producing thereby a solution containing ammonium bisulphite, dividing the said bisulphite solution in two parts, acting on one part of said bisulphite with hydrogen sulphide in such quantities and manner as to convert the bisulphite into both thiosulphate and polythionate by means of the $H_2S$ and treating the remaining bisulphite with sulphur to form thionate therefrom, mixing the two reaction liquors and finally treating same until ammonium sulphate and sulphur are formed.

CHRISTIAN JOHANNES HANSEN.